United States Patent
Reynolds et al.

[11] Patent Number: 5,938,887
[45] Date of Patent: Aug. 17, 1999

[54] APPARATUS FOR FORMING A TRIM PANEL WITH 180° PERIPHERY EDGE WRAP

[75] Inventors: Christopher Reynolds, Oxford, Mich.; Anthony J. Link, North Liberty, Iowa

[73] Assignee: DaimlerChrysler Corporation, Auburn Hills, Mich.

[21] Appl. No.: 08/691,654

[22] Filed: Aug. 2, 1996

[51] Int. Cl.⁶ .................................................. B29C 43/18
[52] U.S. Cl. ......................... 156/475; 264/275; 425/577
[58] Field of Search .......................... 156/475; 264/275; 425/577

[56] References Cited

U.S. PATENT DOCUMENTS

| | | | |
|---|---|---|---|
| 4,370,194 | 1/1983 | Shaver et al. | 156/643 |
| 4,402,118 | 9/1983 | Benedetti | 52/718.06 X |
| 4,793,793 | 12/1988 | Swenson et al. | 425/503 |
| 4,873,036 | 10/1989 | Urai | 264/46.6 |
| 5,273,597 | 12/1993 | Kumagai et al. | 156/79 |
| 5,294,164 | 3/1994 | Shimabara et al. | 296/72 |
| 5,304,273 | 4/1994 | Kenrick et al. | 156/219 |
| 5,348,602 | 9/1994 | Makarenko et al. | 156/161 |
| 5,362,572 | 11/1994 | Hamada et al. | 428/497 |
| 5,367,751 | 11/1994 | DeWitt | 29/295 |
| 5,501,829 | 3/1996 | Nichols | 264/261 |

*Primary Examiner*—Francis J. Lorin

[57] ABSTRACT

An apparatus for forming a trim panel with a one hundred eighty degree periphery edge wrap. The apparatus includes a molding tool having a mold cavity thereon. A loose form block is inserted in the cavity. The form block cooperates with the cavity to define the shape of the periphery edge. Further, the form block supports a trim cover panel such that it is wrapped approximately one hundred eighty degrees about the periphery edge of the trim panel substrate.

10 Claims, 3 Drawing Sheets

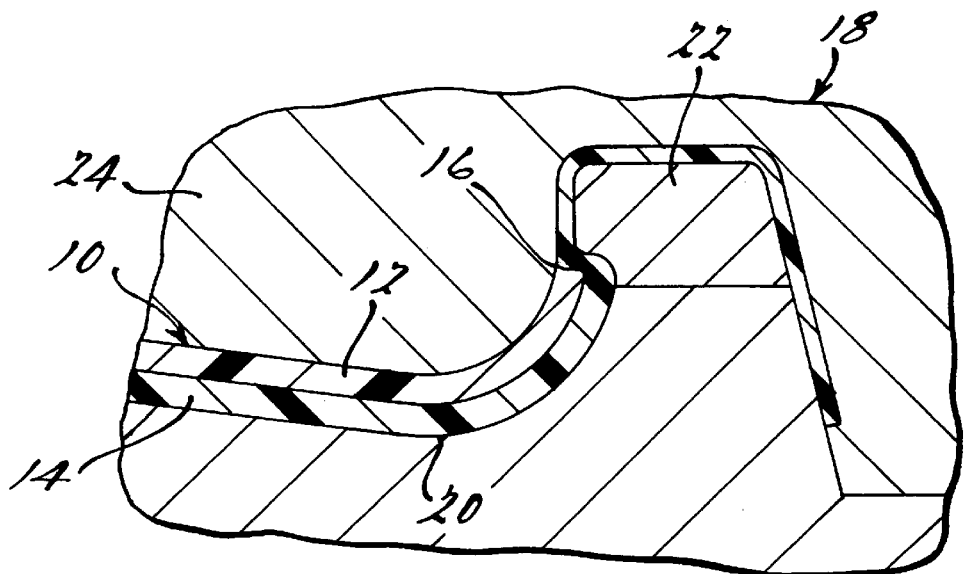
Fig. 1. *Prior Art*
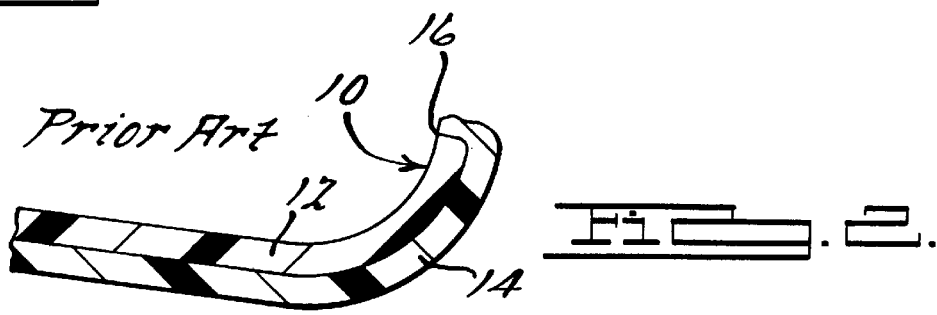
Fig. 2. *Prior Art*
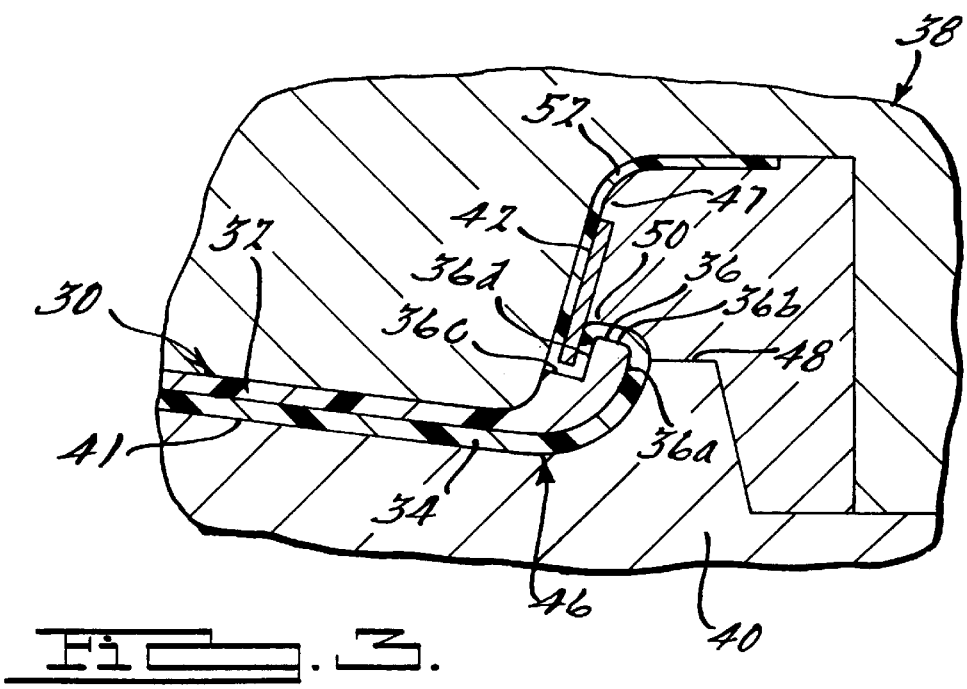
Fig. 3.

5,938,887

APPARATUS FOR FORMING A TRIM PANEL WITH 180° PERIPHERY EDGE WRAP

BACKGROUND OF THE INVENTION

1. Field of the Invention

The present invention relates generally to trim panels for motor vehicles and, more particularly, to an apparatus for forming a trim panel with 180° periphery edge wrap for a motor vehicle.

2. Description of the Related Art

Trim panels are used in occupant compartments of motor vehicles. For example, a vehicle body may include a quarter panel having an inner panel and outer panel joined to each other and connected to a vehicle structure in a known manner. The quarter panel also includes a decorative trim panel mounted on the inner panel.

As illustrated in FIGS. 1 and 2, a trim panel 10 includes a trim panel substrate 12 and a trim panel cover 14 disposed over a portion of the trim panel substrate 12. The trim panel substrate 12 is made of a glass reinforced urethane foam and the trim panel cover 14 is made of a thin layer of vinyl.

For a convertible type motor vehicle, the trim panel 10 has a periphery edge 16 on an upper portion of the trim panel substrate 12 for a topwell area of the vehicle. This periphery edge 16 is visible or exposed when a top of the convertible type motor vehicle is in a down position and is undesired.

Typically, a mold 18 is used to manufacture the trim panel 10. The trim panel cover 14 is placed in a first lower half 20 of the mold 18. A mold ring 22 is hinged to the first or lower half 20 of the mold 18. The ring 22 cooperates with the second or upper half 24 of the mold 18 to hold the trim panel cover 14 in place; i.e., the second or top half 24 of the mold 18 sandwiches the mold ring 22 between the respective halves 20,24 and to hold the trim panel cover 14 in place. A vacuum is applied to the mold 18 to draw the trim panel cover 14 up against the lower half 20 of the mold 18 which forms the trim panel cover 14 to a predetermined shape. Urethane foam material is then injected against an inner surface of the trim panel cover 14 and the lower half 20 of the mold 18 to form the trim panel substrate 12. As a result, the trim panel cover 14 is only wrapped on two surfaces of the periphery edge 16 of the trim panel substrate 12. Thus, there is a need in the art to provide an apparatus for forming a trim panel with a periphery edge wrap having a superior fit and finish.

SUMMARY OF THE INVENTION

It is, therefore, one object of the present invention to provide an apparatus for forming a trim panel with a periphery edge wrap of approximately one hundred eighty degrees (180°).

It is another object of the present invention to provide an apparatus for forming a trim panel with a wrapped periphery edge for use in a topwell area of a convertible type motor vehicle.

To achieve the foregoing objects, the present invention provides an apparatus for forming a 180° trim panel with a periphery edge wrap. The apparatus includes a mold having upper and lower halves defining a mold cavity. A loose piece or form block is placed within the mold cavity. A blade attached to the loose mold piece cooperates with the loose mold piece to form an undercut or indentation. The undercut allows the trim panel cover, during the molding process, to wrap approximately one hundred and eighty degrees, around a periphery edge of the trim panel substrate.

One advantage of the present invention is the loose piece or from block is not limited to one hinge point which is conventionally the major hinge point of the mold. This allows greater die pull freedom and consequently greater design freedom. Another advantage of the present invention is the blade which is attached to the loose piece(s) creates the undercut or indentation which allows the trim cover panel or vinyl skin to be trimmed in a less visible area. Therefore not only is the edge of the part completely wrapped but the cut edge of the vinyl is much less visible than with the conventional tool design. Yet another advantage of the present invention is the loose piece or form block can be used to form more of the backside surface. Still another advantage of the present invention is that the trim panel has an edge wrap extended to three visible surfaces, providing a superior fit/finish and appearance thereof.

Other objects, features and advantages of the present invention will be readily appreciated as the same becomes better understood after reading the subsequent description taken in conjunction with the accompanying drawings.

BRIEF DESCRIPTION OF THE DRAWINGS

FIG. 1 is a cross-sectional fragmentary view of a prior art trim panel with a ninety degree periphery edge wrap illustrated in operational relationship with a mold.

FIG. 2 is a cross-sectional fragmentary view of the prior art trim panel of FIG. 1.

FIG. 3 is a cross-sectional fragmentary view of a trim panel with a one hundred eighty degree periphery edge wrap, according to the present invention, illustrated in operational relationship with a mold.

DESCRIPTION OF THE PREFERRED EMBODIMENT(S)

Figure 4:
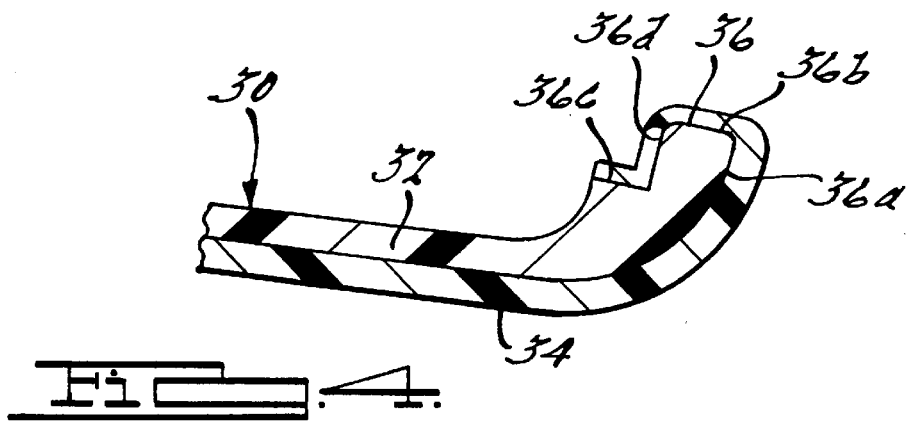
FIG. 4 is a cross-sectional fragmentary view of the trim panel of FIG. 3.

Referring to FIGS. 3 and 4, a trim panel 30, formed with an apparatus according to the present invention, for use in an occupant compartment (not shown) of a motor vehicle (not shown) such as a convertible type motor vehicle, is shown. Preferably, the trim panel 30 is a trim panel which is attached to a quarter panel of the motor vehicle.

As shown in FIG. 4, the trim panel 30 includes a relatively thin trim panel substrate 32 extending vertically and longitudinally. In use, the trim panel 30 is attached to the quarter panel (not shown) by suitable means such as fasteners (not shown). The trim panel substrate is made of a suitable foam material such as a glass reinforced urethane foam. The trim panel 30 also includes a relatively thin trim panel cover 34 extending vertically and longitudinally. The trim panel cover 34 is disposed adjacent the trim panel substrate 32 and attached thereto. The trim panel cover 34 is made of a suitable material such as a relatively lightweight, soft, thin layer of vinyl or the like. Preferably, the trim panel cover 34 is a die cut pad formed by conventional rule cutting as is known in the art.

The trim panel substrate 32 includes a periphery edge 36. The periphery edge 36 includes an outer side 36a and an opposed inner side 36d. The opposed inner and outer sides 36a, 36d are interconnected by an upper end 36b. The periphery edge 36 also includes a lower end 36c connected to the inner side 36d. The trim panel cover 34 is wrapped about the periphery edge 36 such that it extends over at least three surfaces, i.e., the outer side 36a, the upper end 36b, and the inner side 36d. As illustrated, the trim panel cover 34 extends along the outer side 36a. Upon reaching the upper end 36b the trim panel cover 34 turns or is folded approximately ninety degrees and continues along the upper end 36b. Upon reaching the intersection of the upper end 36b and the inner side 36d, the trim panel cover 34 is folded a second time, once again approximately ninety degrees, such that it follows in along the inner side 36d. Upon reaching the intersection of the inner side 36d and the lower end 36c, the trim panel cover 34 is folded again approximately ninety degrees to cover the surface of the lower end 36c.

It should be appreciated that the trim panel cover 34 is wrapped approximately one hundred eighty degrees about the periphery edge 36 of the trim panel substrate 32; i.e., the trim panel cover 34 is attached to both the upper end 36b and the inner side 36d along with the outer side 36a. While the trim panel 10 of the present invention is shown in use with a substantial rectangular periphery edge 36, the periphery 36 could also be circular in cross-section and thus the one hundred and eighty degree wrap would also apply, in that a semi-circle covers one hundred and eighty degrees.

Figure 6:
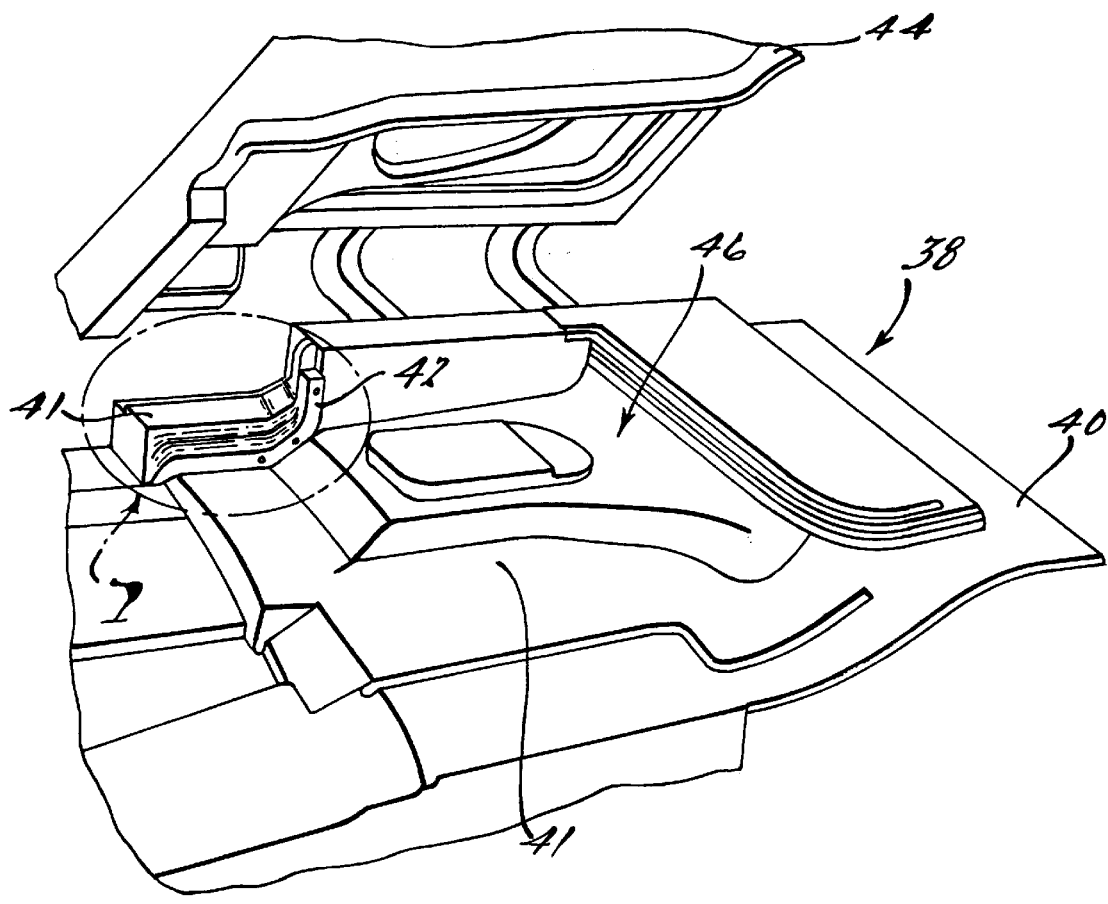
FIG. 6 is a perspective view of an apparatus for forming a trim panel with a 180° periphery edge wrap according to the present invention.
Figure 7:
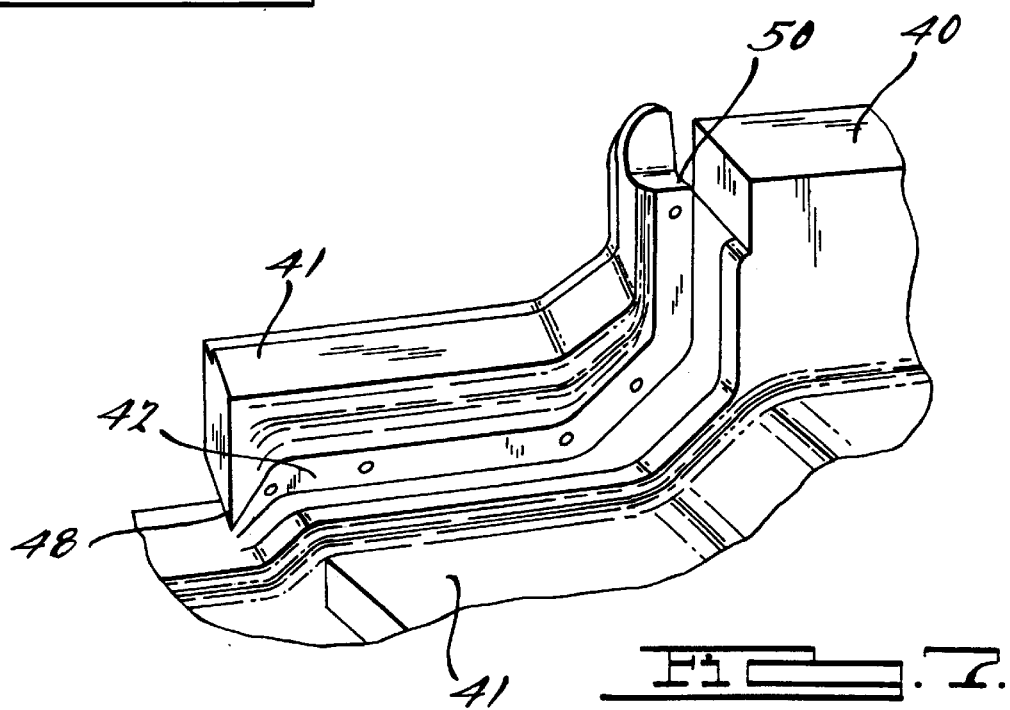
FIG. 7 is an enlarged view of the apparatus according to the present invention of the area shown in circle 7—7 of FIG. 6.

Turning now to the apparatus for forming the trim panel 10. FIG. 6 shows a molding tool, generally indicated at 38, including an upper half 44 and a lower half 40. When the molding tool 38 is closed the upper and lower halves 44,40 form a cavity 46. A loose piece or form block 41 is placed adjacent the cavity 46 typically by positioning it on the lower half 40 of the molding tool 38 prior to closing the respective halves. A blade 42 is attached to the loose piece or form block 41 on an interior face thereof. As shown in FIG. 3, interior face 47 is that face closest to or adjacent the upper half 44 of the molding tool 38 when the tool is closed. The blade 42 extends downward below the lower edge 48 of the form block 41 and defines a gap or indentation 50.

It should be appreciated that more than one loose piece or form block 41 may be placed in the molding tool 38 thus allowing the designer the freedom to form various portions of the trim panel 30 with a periphery edge 36 having a 180° wrap. In use, the loose piece or form block 41 is placed in the lower half 40 of the molding tool 38. As shown in FIG. 6, the form block 41 is only placed in those areas were it is desired to have a periphery edge having a 180° wrap. Once the form block is properly positioned the trim panel cover is then layed in the lower half 40 of the mold to 38. In some instances it may be more appropriate to reverse the steps by laying the trim panel cover 34 in the lower half 40 of the mold 38 and then place the loose piece or form block 41 in position to properly align the form block 41 with the trim panel cover 34.

Once properly positioned within the lower half 40 of the mold 38, the upper half 44 of the mold tool 38 is brought down and mates with the lower half 40 to close the mold tool 38 and form the cavity 46. As shown in FIG. 3 when the respected halves of the mold 38 are closed, they sandwich both the form block 41 and the trim panel cover 34 between them and thus secure and support both the form block 41 and trim panel cover 34 during the molding process. It should be appreciated that a vacuum is drawn in the mold cavity 46 to force and hold the trim panel cover 34 against the inner surface 41 of the lower half 40. Note that the only place the trim panel cover is secured between the upper and lower halves 44,40 of the mold tool 38 is that portion between the blade 42 and the upper half of the mold 44 and the upper surface of the form block 41 and the mold 44. As set forth later this portion of the trim panel cover 34 is excess material or flash 52 which will be trimmed and discarded after the molding process is completed.

To complete the molding process, a calculated volume of trim panel substrate material is injected into the cavity 46. It is necessary to determine the proper amount of material based upon the properties of the trim panel substrate material used because the process is designed such that when the trim panel substrate material cures it creates a suitable pressure to force the trim panel cover 34 against the surface 41 of the mold tool 38. It should be appreciated that the pressure generated during the cure process forces the trim panel cover 34 against the surface 41 of the mold tool 38 and enables a 180° wrap of the peripheral edge 36 to occur. Further, the trim panel substrate material expands to fill the gap or indentation 50 formed by the loose piece or form block 41. In doing so the trim panel substrate 32 thus expands and forces the trim panel cover 34 against the blade 42 and form block 41 (see FIG. 3) to form the periphery edge 36. It is important to note that the molding tool 38 does not squeeze the trim panel cover 34 and trim panel substrate 32 together but rather it is the expansion of the trim panel substrate material which forces the trim panel cover material against the surface 47 of the mold tool 38. Once the trim panel substrate material cures, the mold tool 38 is opened and the loose piece or form block 41 may be removed. Because the loose piece or form block 41 is loose no mold lock occurs.

While disclosed herein as loose; i.e., unattached, the loose piece or form block 41 may be attached to the lower cavity 40 in a manner which enables the form block 41 to be displaced or moved to allow the trim panel 30 to be removed from the molding tool 38. An example of such an attachment includes a plurality of rods attached to the form block 41 at an end thereof. A power cylinder, such as a hydraulic or pneumatic cylinder, is attached to the opposite end of the rods such that actuation of the power cylinder displaces or moves the form block 41. The excess trim panel cover material or flash 52 is then trimmed off typically through the use of a water knife (not shown).

It should be appreciated that the present invention prevents die or mold lock as the loose piece or form block 41 is not hinged to the lower half 44 of the mold tool 38 and may be removed or at least displaced a suitable distance to allow the trim panel 30 to be removed from the mold tool 38. Further, using the expansion force of the trim panel substrate 32 and the indentation 50 formed by the loose piece or form block 41 and the lower half of the mold 44, results in a trim panel 30 having a periphery edge 36 with a 180° wrap.

Figure 5:
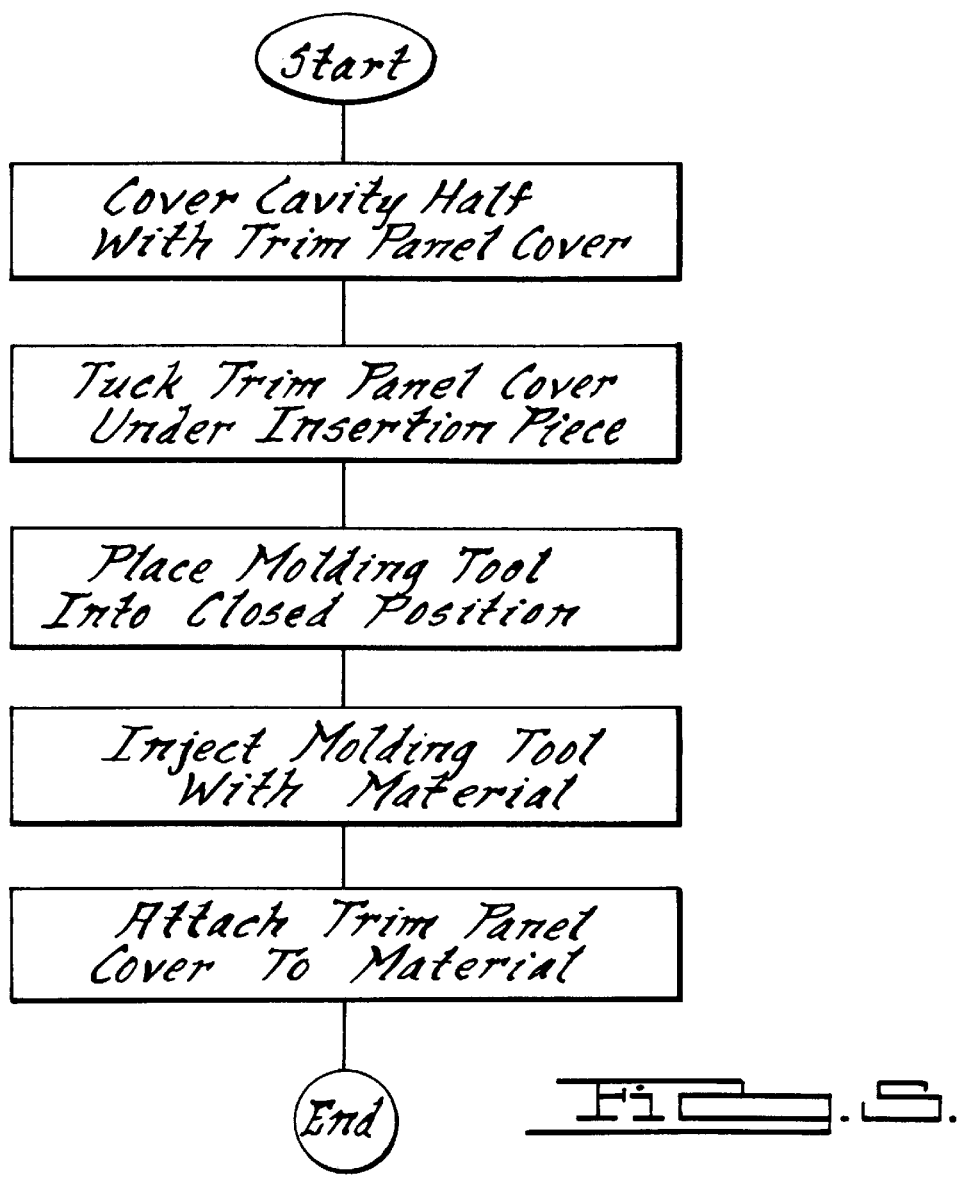
FIG. 5 is a flowchart of a method for making the trim panel of FIGS. 3 and 4.

To form the trim panel 30, a method of making the trim panel 30, according to the present invention, is disclosed in FIG. 5. The method includes the steps of providing a trim panel cover 34 formed from a die cut pad of vinyl material. The method includes placing the trim panel cover 34 in a molding tool, generally indicated at 38, by covering the lower half 40 with the trim panel cover 34. The method includes the steps of placing a loose piece or form block 41 in the mold tool 38. The mold tool 38 is then closed. The method further includes the steps of molding a trim panel substrate 32 against the trim panel cover 34 by injecting a urethane foam material against an inner surface of the trim panel cover 34 to form the trim panel substrate 32.

It should be appreciated that such an apparatus provides a trim panel 30 having periphery edge 36 which is covered by a trim panel cover 34.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. An apparatus for forming a trim panel with a one hundred and eighty degree periphery edge wrap comprising:
    a molding tool having upper and lower halves, said upper and lower halves upon being closed together defining a cavity therebetween;
    a form block disposed within said cavity and engaging said upper and lower halves when said molding tool is closed such that said form block remains stationary; and
    a blade attached to said form block, said blade extending downward below a form block lower half interface and defining an indentation.

2. An apparatus for forming a trim panel as set forth in claim 1 including means for creating a vacuum in said cavity, such that said vacuum pulls a trim panel cover against the lower half of said molding tool.

3. An apparatus for forming a trim panel as set forth in claim 1 including said form block having said blade on an interior face thereof.

4. An apparatus for forming a trim panel as set forth in claim 3 wherein said blade cooperates with an interior surface of said upper half to secure a trim panel cover in position prior to forming the trim panel.

5. An apparatus for forming a trim panel as set forth in claim 1 wherein said form block may be placed in said molding tool at a plurality of positions to form a periphery edge with a one hundred and eighty degree wrap at various portions of said trim panel.

6. An apparatus for forming a trim panel as set forth in claim 1 wherein said indentation is complementary to and forms said periphery edge on said trim panel, said indentation having two opposing interior sides and a bottom end which is complementary to an upper end of said periphery edge.

7. An apparatus for forming a trim panel as set forth in claim 1 wherein said blade forms a projection against which said trim panel is molded such that said blade defines an inner side of said periphery edge.

8. An apparatus for forming a trim panel with a one hundred and eighty degree periphery edge wrap comprising:
    a molding tool having upper and lower halves, said upper and lower halves adapted to be sandwiched together to define a mold cavity therebetween;
    a form block disposed within said cavity, wherein said form block cooperates with said cavity to form an indentation wherein the shape of the indentation controls the shape of the periphery edge of the trim panel; and
    a blade attached to an interior face of said form block and extending downwardly therefrom into said mold cavity such that said periphery edge is formed on at least three surfaces by said form block.

9. An apparatus for forming a trim panel as set forth in claim 8 wherein said form block is removable after a molding cycle is completed.

10. An apparatus for forming a trim panel as set forth in claim 9 wherein said form block cooperates with said upper half of said mold to secure a trim cover panel in position in said cavity prior to said molding cycle.

* * * * *